United States Patent

[11] 3,583,389

| | | |
|---|---|---|
| [72] | Inventor | Douglas G. Harvey<br>Sterling, Ill. |
| [21] | Appl. No. | 739,756 |
| [22] | Filed | June 25, 1968 |
| [45] | Patented | June 8, 1971 |
| [73] | Assignee | NDCH and Co. |

[54] METHOD OF DETECTING APPROACHING BIRTH IN MAMMALS
1 Claim, 3 Drawing Figs.

[52] U.S. Cl. .................................................. 128/2
[51] Int. Cl. .................................................. A61b 5/10
[50] Field of Search .......................................... 128/2, 2.15; 340/279; 119/1

[56] References Cited
UNITED STATES PATENTS
3,273,559  9/1966  Evans .......................... 128/2
3,274,994  9/1966  Storm .......................... 128/2

OTHER REFERENCES
Mackay et al., " Electronics," Engineering Edition, Jan. 3, 1958 pp 51— 53. (128— 2.15)

*Primary Examiner*—William E. Kamm
*Attorney*—Hill, Sherman, Meroni, Gross and Simpson ABSTRACT: Method and apparatus for detecting impending birth in livestock wherein a capsule containing an electromagnetic wave transmitter is positioned within the birth canal of the animal and a temperature sensing device is used to operate the transmitter as determined by the existence of a predetermined temperature. A receiver tuned to the output frequency of the transmitter in the capsule is positioned remotely from the transmitter and provides a visual or audible alarm when the capsule is expelled just prior to birth.

PATENTED JUN 8 1971 3,583,389

INVENTOR.
Douglas G. Harvey

BY  *Hill, Sherman, Meroni, Gross & Simpson*
ATTORNEYS

METHOD OF DETECTING APPROACHING BIRTH IN MAMMALS

BACKGROUND OF THE INVENTION

1. Field of the Invention

The present invention is in the field of animal husbandry and provides a method for warning of impending birth in a mammal using a radio-type transmitter and a temperature sensing device actuating the transmitter, the transmitter serving to emit a signal at the time of impending birth.

2. Description of the Prior Art

With many species of livestock, it is very important that there be advance notice of impending birth so that an attendant can be alerted to assist at the delivery. This is particularly true in the case of sows. The period of gestation of a sow is sixteen weeks. The sow normally delivers six to eight pigs in the first litter and ten to twelve afterwards. Out of the total possibility of twelve in the litter, it is not uncommon to lose four or more because of accidents incident to an unattended farrow. It then becomes necessary for an attendant to be present for an indefinite time prior to delivery in order to minimize the risk of loss in the litter. Since the actual time of delivery is uncertain, this necessitates a substantial loss in time by the attendants.

SUMMARY OF THE INVENTION

The invention is concerned with a method of detecting impending birth in livestock and domestic animals wherein an electromagnetic radiation transmitter device is positioned in the birth canal of the animal, and a receiver tuned to the frequency of transmission of the transmitter and located remotely from the transmitter receives signals from the transmitter. The transmitter is arranged to either be energized or deenergized in response to the attainment of a predetermined temperature. The transmitter device is in the form of a capsule which is readily insertable into the canal and is provided with frequency adjusting and temperature setting adjustments which are accessible by opening the capsule. In the preferred embodiment of the invention, the capsule is composed of a plurality of mating sections each composed of a synthetic resinous material having a low coefficient of friction.

The receiver can be coupled to a relay or other device which will actuate a warning system such as an audible sound or a light advising the attendant of the imminence of birth.

DESCRIPTION OF THE PREFERRED EMBODIMENTS

Figure 1:
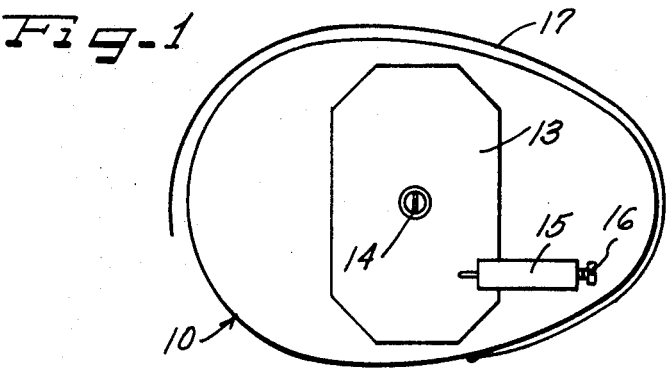
FIG. 1 is a plan view of a device suitable for the practice of the present invention, with the cover removed to illustrate the interior construction.
Figure 2:
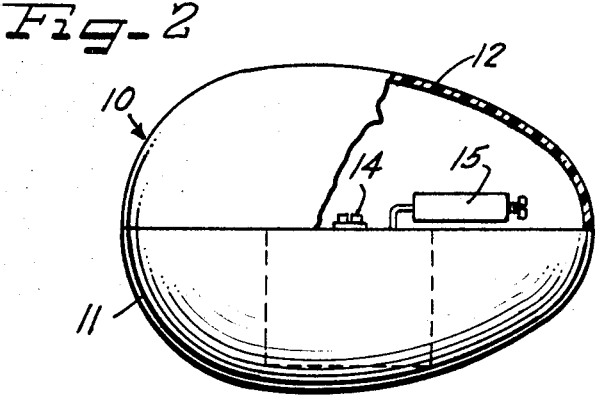
FIG. 2 is a view in elevation, partly broken away of the structure with the cover in place.
Figure 3:
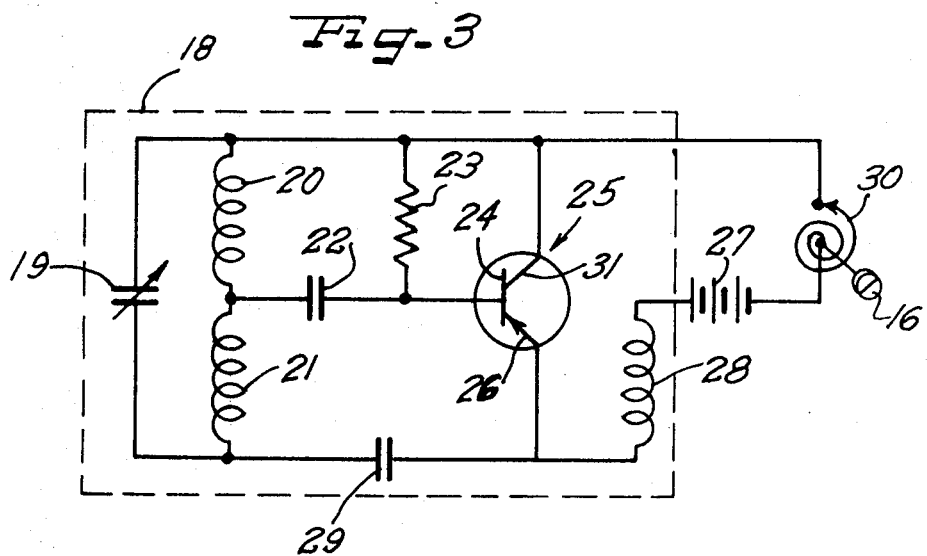
FIG. 3 is a circuit diagram of a radio frequency oscillator circuit which may be employed in the transmitter of the present invention.

In FIG. 1, reference numeral 10 indicates generally a hollow capsule of the type which can be employed in accordance with the present invention. As best seen in FIG. 2, the capsule 10 may include a lower half 11 and an upper half 12 which are matingly engaged, both halves being composed of a synthetic resinous material of low coefficient of friction such as polyethylene or the like. Disposed within the lower half 11 is a module 13 containing most of the electronic components of the transmitting device, the module 13 having an adjusting screw 14 extending therefrom for the purpose of adjusting the frequency of operation of the transmitter as will be apparent from a succeeding portion of this description. Also extending from the module 13 is a thermostat 15 provided with an adjusting screw 16 for setting the level at which the thermostat operates. Although not always necessary, the capsule 10 may be provided with a wire antenna 17 trained partially therearound so as not to interfere with the insertion of the capsule into the canal. As illustrated in FIG. 3, the transmitter employed in the present invention may be a typical shunt fed Hartley oscillator circuit. The portions of the circuit which may be conveniently included within the module 13 are illustrated within the dashed lines 18. The tank circuit of the oscillator includes a variable capacitor 19, the adjustment of which is accomplished by the setting of the screw 14, and a pair of coils 20 and 21 connected in series. The junction between the coils 20 and 21 is connected to a grid leak circuit consisting of a capacitor 22 and a resistor 23. The grid leak arrangement makes the oscillator self starting and is more likely to give a stable operating point under conditions corresponding to high efficiency operation. The use of a grid leak also tends to make the oscillator self adjusting at conditions corresponding to good efficiency, and improves the frequency stability. The junction between the capacitor 22 and the resistor 23 is connected to a base 24 of a transistor 25. An emitter 26 of the transistor 25 is connected to a battery 27 through a radio frequency choke 28. The usual bypass capacitor 29 is included between the emitter 26 and the coil 21.

A negative potential from the battery 27 is applied through a thermostat 30 to the collector 31 of the transistor 25. As illustrated in FIG. 3, the thermostat 30 may be of the spirally wound type with adjusting screw 16 being used to predetermine the tension in the spiral and thereby set the operating point at which the thermostat opens. In the particular embodiment shown in FIG. 3, the transmitter is designed to be operative below the critical temperature, and to be deenergized by the opening of the thermostat 30 upon reaching the predetermined temperature. In the case of sows, it has been found convenient to use a thermostat which opens at about 100°F. and closes at about 90°F.

With the arrangement shown in FIG. 3, the transmitter is deenergized when the temperature sensed is the normal temperature in the canal, a temperature of about 101°F. in the case of sows. However, when the capsule is expelled during labor, the thermostat 30 promptly reaches a lower temperature and thereupon closes, rendering the transmitter operative. A visual or audible means associated with a remotely positioned receiver can then provide a signal to the attendant that his assistance will be required momentarily.

Of course, the transmitter can be designed so that it transmits only upon an increase in temperature whereupon the receiver becomes operative to render a visual or audible warning. This type of arrangement can be used to detect fever in the sow which could contaminate the milk for the litter or it could be used for detecting ovulation in the animal and thereby improve the possibilities of fertilization.

From the foregoing, it will be understood that the present invention provides a method and apparatus for detecting impending birth in animals which makes it possible for the breeder to be warned in advance so as to be in attendance at the time of the farrow without monopolizing his time otherwise.

It should be understood that various modifications can be made to the described embodiments without departing from the scope of the present invention.

I claim as my invention:

1. The method of detecting impending birth in an animal which comprises positioning an electromagnetic radiation transmitter device in the birth canal of the animal, said transmitter device being inoperative at the temperature within said canal and operative at a temperature lower than said canal temperature, positioning a receiver tuned to receive radiation from said transmitter device in a location remote from said transmitter device, and generating an alarm signal in response to radiation received from said transmitter device.